Oct. 25, 1966    J. C. HOHNE, JR    3,281,635
PULSE FED D.C. MOTOR SPEED SYSTEM
Filed Sept. 30, 1965    4 Sheets-Sheet 1
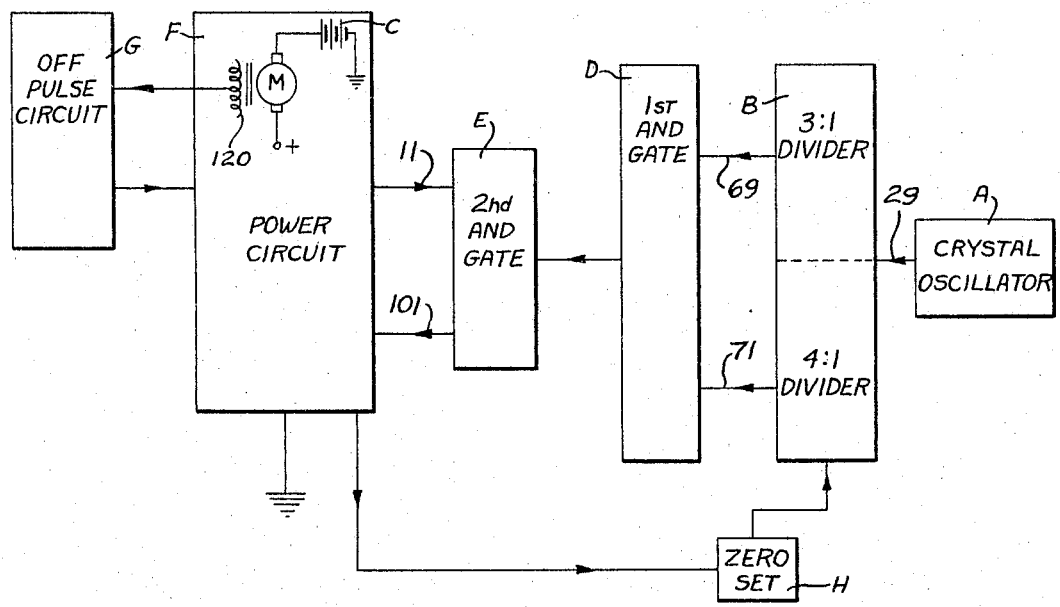
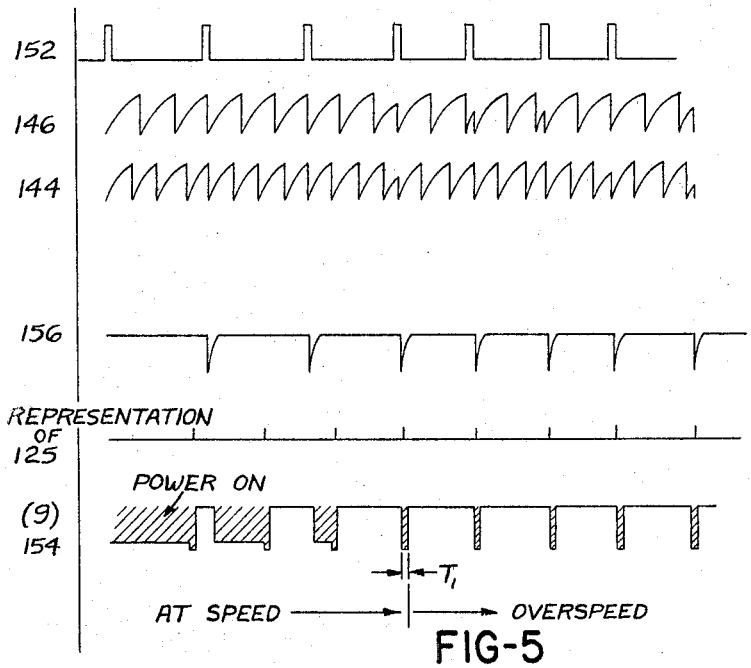
FIG-5
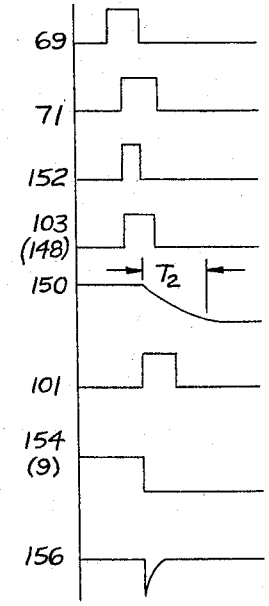
FIG-6
INVENTOR.
JACK C. HOHNE, JR.
ATTORNEY

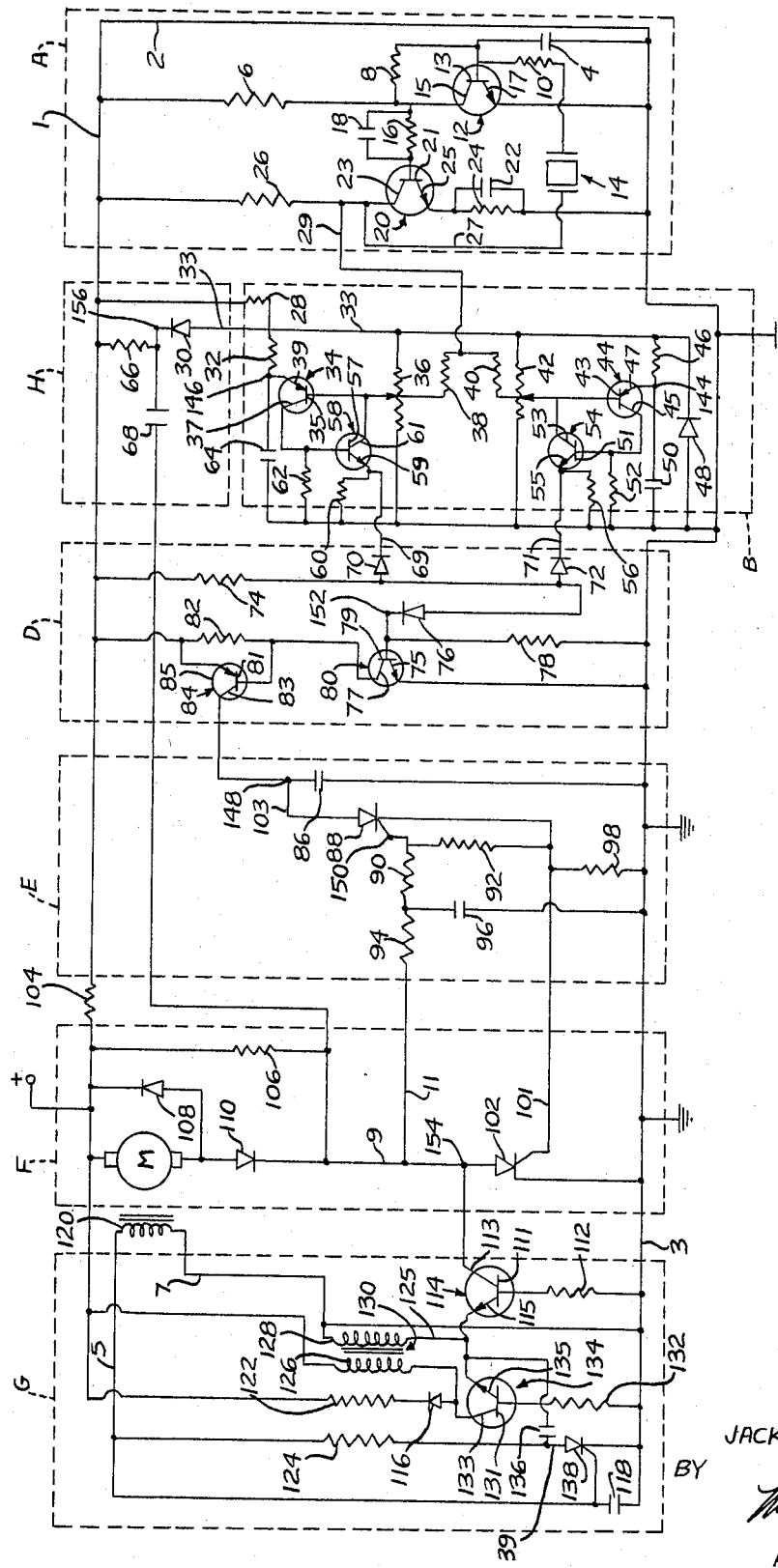

Oct. 25, 1966

J. C. HOHNE, JR 3,281,635

PULSE FED D.C. MOTOR SPEED SYSTEM

Filed Sept. 30, 1965

INVENTOR.
JACK C. HOHNE, JR.

BY *Willis E. Gilbert*

ATTORNEY

Oct. 25, 1966   J. C. HOHNE, JR   3,281,635
PULSE FED D.C. MOTOR SPEED SYSTEM
Filed Sept. 30, 1965

INVENTOR
JACK C. HOHNE, JR.

BY *Milton E. Gilbert*

ATTORNEY

United States Patent Office 3,281,635
Patented Oct. 25, 1966

3,281,635
PULSE FED D.C. MOTOR SPEED SYSTEM
Jack C. Hohne, Jr., Tipp City, Ohio, assignor to Globe Industries, Inc., Dayton, Ohio, a corporation of Ohio
Filed Sept. 30, 1965, Ser. No. 491,785
12 Claims. (Cl. 318—314)

This application is a continuation-in-part of application Serial Number 207,682 filed July 5, 1962, now abandoned.

This invention relates to a speed control for a motor, and more particularly to a speed control for a permanent magnet D.C. motor.

For the purpose of controlling the speed of an electric motor, various types of mechanical governors have been used in the past to maintain the speed within desired limits. In such devices centrifugally actuated reed type switches are usually employed for making and breaking the power circuit to the motor. Such devices have been found to be extremely dependent upon temperature changes, vibration changes and other external environments which render them substantially unusable for those applications where extremely sensitive speed control is desired.

It is one object of the invention therefore to provide a speed control system for a motor that is capable of holding speed to extremely small tolerances. It is a further object of the invention to provide a motor speed control which is substantially insensitive to ambient conditions such as extreme temperature variations and vibration. A still further object of the invention is to provide a motor speed control system which will operate from the power source normally provided for the motor and which requires no additional (or different type of) power. A still further object of the invention is to provide a motor speed control for miniature motors which is extremely rugged and yet simple of manufacture.

These and further objects and advantages of the invention will become more readily apparent upon a reading of the description following hereinafter, and upon an examination of the drawings, in which:

FIG. 1 is a block diagram of the motor speed control system of the invention;

FIG. 2 is a schematic wiring diagram indicating one embodiment of the invention described in FIG. 1;

FIG. 5 is a compressed representation of a waveform timing diagram indicating the overspeed mode of operation;

FIG. 6 is a waveform timing diagram indicating the various relationships occurring at the points indicated in the circuit at timing interval $T_2$.

The invention provides a motor speed control system capable of holding speed exactly synchronous with a reference frequency source, while employing a relatively insignificant amount of power from this reference source as compared with the power used to drive the motor. A very stable time base is provided as distinguished from the RC type of time base employed in my prior invention, Application Ser. No. 738,776 for Motion Control, filed May 29, 1958 now abandoned, and its continuation application Ser. No. 221,651, filed August 20, 1962, now Patent No. 3,192,461. Thus, a crystal oscillator is employed as a time base. The motor is turned on by the time base or crystal oscillator and its associated networks, and is turned off by a pulse from the motor. The crystal oscillator thus provides a very stable reference frequency.

Figure 3:
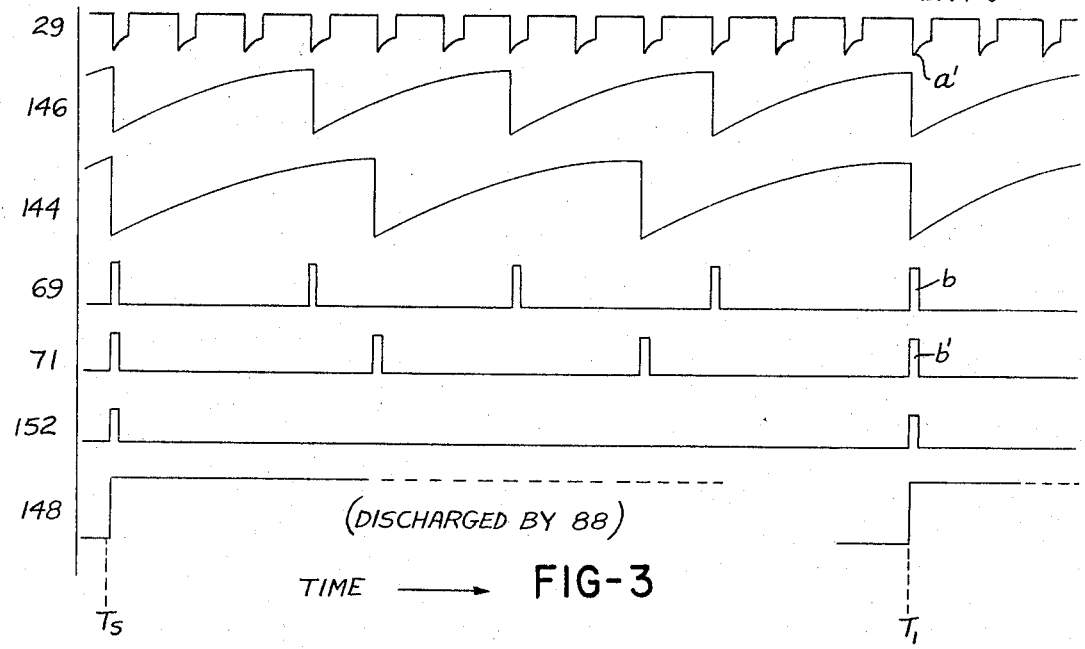
FIG. 3 is a waveform timing diagram indicating the output of the network A, B and D.
Figure 4:
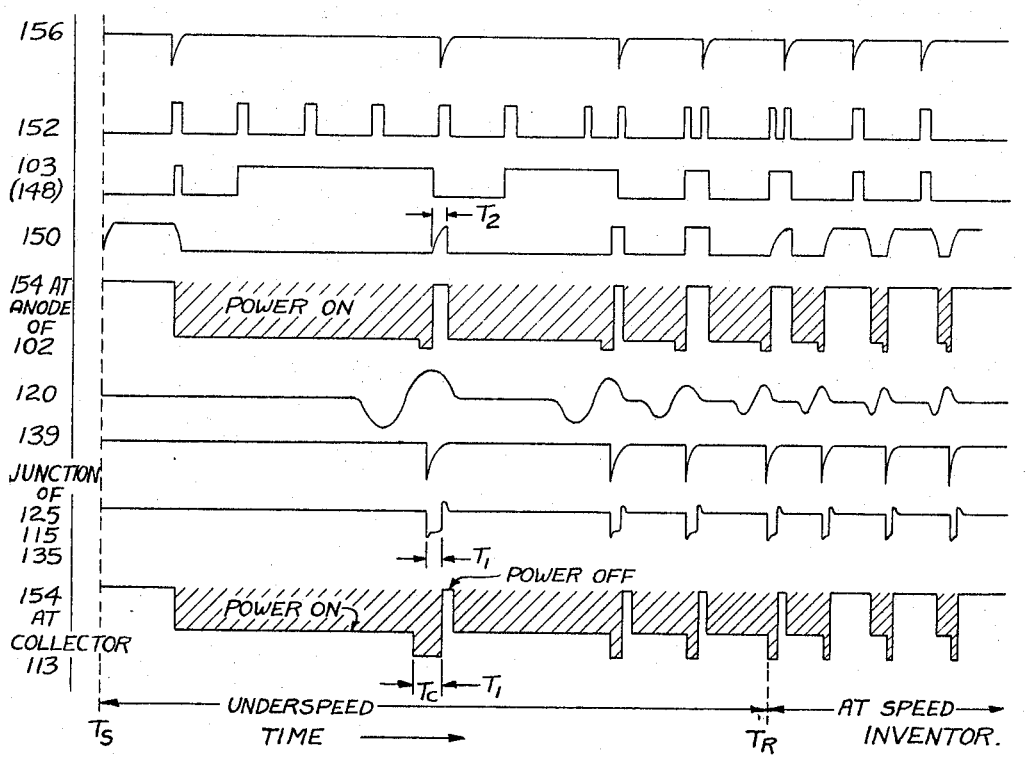
FIG. 4 is a waveform timing diagram indicating the operation of the motor speed control system in underspeed and constant speed modes.

As seen in FIG. 1, the output of a crystal oscillator time base A is fed into a divider network B which essentially comprises two dividers, one set a 3:1 ratio and the other set at a 4:1 ratio, although it is to be understood that various other ratios and divider arrangements may be used. The output of this divider network B is fed into an AND gate D, and the output of this AND gate is used as one input to a second AND gate E. The other input to this second AND gate is provided by the power circuit F, which circuit also receives "on" pulses from the second AND gate E, in order to provide substantially constant power to be applied to the motor when below speed. A zeroing or resetting network H receives its zeroing signal from the power circuit to reset the dividers in the event of overspeed of the motor, which prevents "on" pulses from being applied to the motor during such overspeed condition. "Off" or feedback pulses are generated by a pickup coil 120 which provides the input for an off pulse circuit G, whose output is used to turn power off in the power circuit F by disabling transmission of "on" pulses to the motor. In one embodiment of the invention, the crystal oscillator A is a two transistor crystal oscillator which generates square wave type pulses as illustrated in FIG. 3 at the frequency determined by the crystal characteristics. A negative spike "$a$" is purposely created at the negative going portion of the square wave, as indicated in FIG. 3. This pulse is fed to the divider network B which essentially is two separate dividers. The frequency is divided by three in one portion of network B, and by four in another portion of network B, as indicated in FIG. 4. The frequency of the crystal oscillator employed is relatively high, in view of the extreme environmental conditions required for the system of the invention. However, in order to adapt such crystal to use in connection with lower frequency motors, a two divider network is employed. In this arrangement, the first AND gate D will not produce an output until and unless both divider networks comprising the network B produce an output pulse at the same time. This is indicated at "$b$" in FIG. 4. The output of the network B then is two series of pulses as illustrated in FIG. 4. When the pulse trains coincide as at "$b'$" in FIG. 4, the first AND gate D is triggered. The output pulse of the first AND gate D is indicated in FIG. 5 in time relationship with the pulse train created by the crystal oscillator. The amplitude of the pulse created by the first AND gate D is determined by the components thereof, however, the frequency is determined in accordance with the crystal oscillator frequency. The networks A, B and D can thus be considered as an oscillator of fixed time period having pre-set controlled discharge means.

The output of AND gate D serves as one input to the AND gate E. The second input to the AND gate E is a signal from the power circuit F. The proper input to trigger the AND gate E is a voltage level existing when the motor is off, i.e., when no power is applied to the motor. Under such conditions an output pulse is obtained from AND gate E whose duration and amplitude is controlled only by this circuit, and which turns on the power circuit F. The output of the network E is indicated in FIG. 6.

A function of the AND gate E is to prevent under speeding of the motor. Thus, if the motor is operating below speed it will receive another "on" pulse each time an off pulse is generated by the network G. Once the motor reaches the desired speed, the instant of turn-on is controlled by the AND gate D, since under these conditions the power circuit will have been off prior to the time AND gate D produces timing pulses.

The power circuit F applies power to the motor when it is triggered by AND gate E. A power source is indicated at "C" in FIG. 1. A pickup coil 120 is employed in a manner similar to that described in my prior applications Serial Nos. 738,776 and 221,651, referred to above, to generate off pulses in an off pulse circuit G which are fed into the power circuit F. These off pulses are thereafter compared in the power circuit with the on pulses, to the extent of maintaining the same time spacing between these pulses as that which is peculiar to the reference pulses (AND gate D). In other words, the frequency and phase of the output signal of AND gate D is brought into synchronism with those of the off pulse circuit G, until the motor has reached the speed related to the frequency of the output signal of AND gate D.

CRYSTAL OSCILLATOR NETWORK

As shown in FIG. 2, the crystal oscillator network A essentially comprises a multi-vibrator type circuit employing the two transistors 12 and 20. A positive signal from line 1 is fed to the base 13 of transistor 12 via resistors 6 and 8. This produces a small value of base current to bring the collector 15 slightly negative. When the collector 15 becomes negative, the resistor 16 reduces the base drive to the base 21 of transistor 20. When the base drive to transistor 20 is reduced, the collector 23 will tend to go positive. This positive going voltage at the collector 23 of the transistor 20 is coupled via line 27 to the crystal 14 and through the crystal 14 and resistor 10 to the base 13 of the transistor 12. This action continues until the transistors saturate or until the transistor 12 loses enough base drive to continue this current flow, at which point the cycle reverses, i.e., the base 13 of transistor 12 becomes negative, tending to turn it off, and the collector 15 goes positive so that the base 21 of transistor 20 goes positive and the collector 23 of transistor 20 goes negative, tending to make the base 13 of transistor 12 more negative. This oscillation continues at the crystal frequency. The transistor 20 is purposely overdriven so that the collector 23 produces a substantially square wave in the output line 29, as indicated in FIG. 3. Capacitors 18 and 22 in the network A cause the negative spike $a,a$ to appear in the output shown in FIG. 3. The negative going spike serves to aid the divider network, as described hereinafter.

Resistor 10 limits the power to the crystal 14. The combination of resistors 8 and 10 together with capacitor 4 forms a low pass filter to prevent the crystal from operating at higher values than its desired frequency. The combination of capacitor 2 and resistor 104 forms a filter network to prevent line transients from influencing the crystal, divider and other networks.

The resistors 24, 26, 6, 8 and 16 all also serve to provide the proper operating biases for the transistors 20 and 12.

DIVIDER NETWORK B

The input in line 29 to the divider network B is fed through a pair of high value resistors 38 and 40 to reduce the divider signal feeding back to the crystal, and to keep the two divider stages isolated from each other.

Lines 33 provides a voltage source which is held at a constant voltage by the zener diode 48 and the resistor 28 which form a voltage regulating circuit. The percentage of this voltage used as a reference by the two divider networks is determined by the settings of the potentiometers 36 and 42. Describing first the upper divider circuit (which is a 3:1 divider in the preferred embodiment), there is provided a capacitor 64 and resistor 32 which form an RC time base network or a charging network. The capacitor 64 would therefore tend to charge up to the required voltage supplied by line 33. However, since the emitter 39 of transistor 34 is connected to the junction between capacitor 64 and resistor 32, once the voltage at this junction exceeds the voltage reference set by the potentiometer 36, (transistor 34 turns on and conducts. When this transistor conducts, the collector 37 is more positive than ground, causing current to flow to the base 57 of transistor 58. Transistor 58 is thereby made to conduct. As transistor 58 begins to conduct, it causes the voltage at the wiper of potentiometer 36 to approach ground, since the current flow is from collector 61 to emitter 59. This current flow causes the base 35 of transistor 34 to become more negative, which causes additional current flow through transistor 34. This regeneration will further drive the voltage at the wiper of the potentiometer 36 towards ground. The transistors 34 and 58 therefore discharge capacitor 64 to ground potential, at which time the current from resistor 32 is not sufficient to maintain the transistors 34 and 58 in the conducting state, and they therefore turn off. Once they are turned off, capacitor 64 begins to recharge. Resistor 60 is a relatively low value resistor used to obtain a short positive output pulse upon the discharge of capacitor 64. Resistor 62 clamps the base 57 of transistor 58 and collector 37 of transistor 34 at ground potential when these transistors are off. By properly selecting the resistor 62, the divider circuit can be prevented from free-running, and thus the capacitor 64 will not discharge until a synchronizing signal is provided by resistor 38.

The lower portion of the divider (i.e., the 4:1 divider in the preferred embodiment) is similarly arranged whereby the potentiometer 42 performs the same function as the potentiometer 36 in the 3:1 divider, and the transistors 44 and 54 are functionally equivalent to the transistors 34 and 58; and the resistors 46, 52 and 56 perform the same functions as resistors 32, 62 and 60. Thus, a similar positive going output signal is caused to appear in the line 71, upon the discharge of capacitor 50 through the resistor 56. The pulses appearing in line 71 and 69, respectively, are as indicated in FIG. 4; i.e., the pulses $a',a''$ and $b,b'$.

AND GATE D

Normally, current will pass through resistor 74 connected to the filtered power line 1, and because of the polarity of diodes 70 and 72, this current will pass through diode 70, resistor 60, to ground, and also through diode 72, resistor 56, to ground. The current flow is controlled by the values of the resistors 74, 60 and 56. The resistor 74 is normally a significantly higher value than the resistors 60 or 56. There is also provided a path for current flow through diode 76, and resistor 78 and/or the base 79 of transistor 80. Because of the component values of resistors 56 and 60, and the characteristics of the diode portion of transistor 80, i.e., base 79 and emitter 75, there will be little or no current flow through transistor 80. Thus the current flow is through diode 70 and/or diode 72. When a positive going pulse appears in line 69, current flow is prevented through diode 70, and similarly when a positive pulse appears in line 71, current flow is prevented through diode 72. Thus, when diode 70 is reverse biased, current flowing through resistor 74 will pass through diode 72 and resistor 56 to ground. Conversely, when diode 72 is reverse biased, current flowing through resistor 74 will pass through diode 70 and resistor 56 to ground. However, when the pulses $b,b'$ coincide as indicated in FIG. 4, then both diodes 70 and 72 will be reverse biased. Under this condition all of the current flow through resistor 74 will go to diode 76. The base 79 of transistor 80 will then be biased so that transistor 80 is switched on. The value of resistor 78 is such that most of this current will flow through transistor 80. When transistor 80 is turned on, the collector 77 becomes negative and draws current through resistor 82 and also from the base 81 of transistor 84. The resistor 82 is selected of such value that most of the current to collector 77 comes from the base 81 of transistor 84. Transistor 84, which is connected to the filtered power line, then becomes conductive with current flow from emitter 85 to collector 83. A voltage is thereby impressed across capacitor 86. Thus, a positive pulse as indicated in FIG. 5 will occur only when both diodes 70 and 72 are reverse biased; i.e., when the positive pulses in lines 69 and 71 coincide in time. Therefore, the AND gate D will provide a positive signal once in every twelve cycles of the crystal oscillator A, in view of the 3:1 and 4:1 divider networks B.

SECOND AND GATE E

As indicated above, the AND gate D will provide an output signal at the collector 83 of transistor 84, when the divider networks provide blocking pulses in the lines 69 and 71 at the diodes 70 and 72. This output from the AND gate D is a positive going signal which will appear at the anode of control rectifier 88. A second input to the AND Gate E is a D.C. voltage obtained from the anode of control rectifier 102. When control rectifier 102 is off, the motor is off and the anode of control rectifier 102 is connected to the plus voltage source through resistor 106. This positive D.C. voltage will therefore cause current to flow through resistors 94, 90, 92 and 98 to ground. Such D.C. current flowing through this resistor network establishes a gate current into the control rectifier 88, so that the control rectifier 88 is in condition to conduct any time voltage appears at its anode. This anode voltage is caused by the output of the AND Gate D, as indicated above. At underspeed conditions, i.e., when the motor is running below the desired speed, the output of the AND Gate D occurs during the time when the control rectifier 102 and the motor are "on" (i.e., the motor is receiving power and the voltage at the anode of control rectifier 102 is at or near ground). There will then be little or no current flow throguh the resistors 94, 90, 92 and 98, and thus there is no gate current into control rectifier 88. The positive signal obtained from AND Gate D is thereby stored in capacitor 86. By storing this positive pulse in capacitor 86, AND Gate E is enabled to turn the motor on immediately after the power circuit (i.e., control rectifier 102) is turned off. Thus, the motor receives substantially constant power when operating below the desired speed.

Capacitor 96 provides slight time delay so that the gate of control rectifier 88 is still forward biased when a positive pulse from the zero reset circuit H (described hereinafter) appears at the anode of control rectifier 88.

OFF PUSE CIRCUIT G

A pickup coil 120 is provided in the motor construction to sense the rotational speed of the motor by generating voltage pulses in accordance with the speed at which the armature slots pass beneath the coil 120. This constructional feature is described in detail in my co-pending application Serial No. 738,776, referred to above. This coil 120 is a low impedance coil which generates a signal in the line 5. This signal appears across the gate of control rectifier 138. When the current value into the gate of control rectifier 138 reaches the proper value, the control rectifier 138 switches into a low impedance state and the voltage at the anode 139 suddenly changes to a lower value, causing a negative pulse to be coupled through capacitor 136 to the emitter 135 of transistor 134. A pulse transformer 130 is connected in the collector circuit 133 of the transistor 134. The transformer 130 has two windings 126 and 128. Winding 128 is connected to the emitter 135 of transistor 134 so that the negative pulse caused by the pickup coil 120, and the control rectifier 138 starts current flow into transistor 134, which causes the collector end of the winding 126 to go negative. This induces an additional negative voltage in the line 125, which in turn causes additional current to flow in transistor 134. The transistor 134 is therefore turned on and remains on for a time period determined by the characteristics of the transformer 130 itself.

The winding 128 is also connected to the emitter 115 of transistor 114. Since the voltage at the emitter 115 of transistor 114 is several volts negative with respect to line 3, and the transistor 114 is saturated by the base current flowing through resistor 112, the collector 113 is also several volts below line 3. Further, since the collector 113 of transistor 114 is connected to the anode of control rectifier 102, this negative voltage causes a reverse bias across control rectifier 102 which allows the control rectifier 102 to turn off. At the end of this pulse as determined by transformer 130, the transistor 114 returns to an off condition; and since control rectifier 102 is also off, the motor is also turned off, i.e., it can receive no further power from the power source.

At the conclusion of this pluse, because the transformer 130 is an inductance, there would be an induced voltage transient appearing at collector 133 of transistor 134. The diode 116 and resistor 122 are connected from the collector line 133 to prevent this voltage from damaging the transistor 134. Resistor 132 provides base current to transistor 134 during the pulse, and establishes the proper potential during the time transistor 134 is off.

POWER CIRCUIT F

The motor M is considered as part of the power circuit. It is preferably a permanent magnet motor. It receives current from a power source (indicated by + in FIGURE 2) and the current flows through the motor, through the diode 110, and then through the control rectifier 102 to ground. When the motor is off, and since in the case of a permanent magnet motor it will generate a voltage as long as it is rotating, diode 110 is provided to block this generated voltage from appearing at the anode of control rectifier 102. At the time the motor turns off, the inductive voltage transient caused by the motor is prevented from damaging the control rectifier 102 or other portions of the circuit by the diode 108.

A resistor 106 biases the anode of control rectifier 102 at or near the positive voltage source during the time the rectifier is off, since a source of power is required for the resistors 94, 90, 92 and 98. Resistor 106 also provides the necessary "holding current" through rectifier 102 when the motor commutates.

ZERO SETTING NETWORK H

This network provides a means for resetting or zero setting the divider networks B. Under overspeed conditions, the anode of control rectifier 102 will receive an off pulse from network G when the motor is already off; and under these conditions it is desirable to prevent power from being transmitted to the motor. The anode of 102 switches negatively either from control rectifier 102 turning on, or from transistor 114 turning on, when control rectifier 102 is off. When the control rectifier 102 turns on, it is on as a result of an output from the divider networks B. There is very little time delay through the two and gates, so that the control rectifier 102 anode goes negative when the timing capacitors 50 and 64 are at zero voltage.

During overspeed conditions the off pulse generated by the network G, during the time when control rectifier 102 is off, causes a negative pulse to be coupled through capacitor 68 and diode 30, which reduces the regulated voltage on line 33 and the potentiometers 36 and 42. This reduction in voltage causes capacitors 64 and 50 to be discharged, thus setting each divider to zero time and insuring that no more "on" pulses will be generated until the period corresponding to the desired frequency has elapsed. Thus, as long as the period between the "off" pulses is shorter than the desired period, i.e., the motor runs fast, no "on" pulses will be transmitted to the gate of control rectifier 102. Capacitor 96 maintains the proper input to AND gate E for a sufficient length of time so that the output pulse from AND gate D is not "held" by capacitor 86 during the operation. The duration of the pulse generated by transformer 130 is such that the pulse output of AND gate E caused by network H occurs during the time the control rectifier 102 is reverse biased by transistor 114.

OPERATION

The speed control system of the invention essentially operates in three modes of operation, i.e., underspeed, overspeed and constant or desired speed condition of the motor. When electrical power is applied through the terminal marked plus in FIGURE 2, voltage is supplied to the crystal oscillator circuit A which provides an output in line 29, as shown in FIGURE 3. This output is a substantially square-wave, as shown, with negative spikes, $a,a$ appearing at the beginning of each pulse. The output obtained at the emitter of transistor 34 (146) is a function of capacitor 64 and resistor 32. Since this is a 3:1 divider network, it will have an output of sawtooth shape ⅓ that of the crystal frequency, i.e., four pulses for each twelve pulses of the crystal. As shown in FIGURE 3, with the device starting at Time $T_s$ the twelve cycles of the crystal oscillator will occur at the end of Time $T_1$, at which time the output of the 3:1 divider will deliver four pulses. The output of the 4:1 divider will deliver three pulses at Time $T_1$, as indicated in FIGURE 3 at point 144. The waveform at 144 is a function of the capacitor 50 and resistor 46 and is the output of emitter 47 of transistor 44 (see FIGURE 2). It is thus seen that at Time $T_1$ the discharge part of both sawtooth waveforms at points 144 and 146 occur at the same time, and the pulses that occur at lines 69 and 71 occur at the same time ($b,b'$). When this occurs, an output will be obtained from the And Gate D at point 152. This is the base of transistor 80 and the cathode side of diode 76. This is the first amplifier of the And Gate D and the signal is again amplified by the transistor 84 to provide a positive pulse at point 149, which is stored in the capacitor 86. The potential remains on capacitor 86 until it is discharged by the control rectifier 88 when there is a positive voltage at the Gate 150 of the rectifier 88. This occurs at Time $T_1$ as shown in FIGURE 3.

The underspeed mode of operation is illustrated in FIGURE 4 which compresses the waveform to a somewhat smaller scale than that shown in FIGURE 3. Commencing at time $T_s$ power is turned on and an oscillator network provides the pulse train as shown at 152 in FIGURE 4. At Time $T_s$ point 152 has no voltage, but when the first output of the And Gate D occurs, the voltage pulses will appear as short squarewaves as shown in FIGURE 4. During this time, 150 has positive voltage upon it since line 9 is connected to the plus voltage input through resistor 106. A slight time delay occurs, as shown in FIGURE 4, due to the presence of the resistors 94, 90, and capacitor 96. Thus, voltage is present at the gate of control rectifier 88 and as soon as a positive voltage appears in line 103, then the control rectifier 88 will fire and when it does so the discharge current from capacitor 86 will appear as a voltage across resistor 98, and through line 101 at the gate of control rectifier 102. Thus, the second And Gate E has an output in line 101 when the capacitor 86 discharges. When the control rectifier 102 has fired, then line 9 is connected to ground and motor M has power across it, as indicated by the shaded portions in FIGURE 4. With power applied to the motor, it will accelerate and eventually a voltage pulse will be created in coil 120, as shown in FIGURE 4. This positive going voltage pulse will appear in line 5 and at the anode of control rectifier 138. The control rectifier 138 will then discharge to provide a negative spike at anode 139. This negative transient is coupled through capacitor 136 into the emitters 135 and 115 of transistors 134 and 114, respectively. These transistors act as amplifiers and pulse shapers. The transistor 134 has a pulse transformer 130 connected to it, so as to make a one-shot blocking oscillator out of it to produce a relatively constant width, constant amplitude output. This output is coupled through the same transformer 130 to the emitter 115 of transistor 114 and appears as a negative going voltage at the collector 113 of transistor 114, which is the same as point 154. The negative going voltage at collector 113 takes the anode of control rectifier 102 more negative to reverse bias it, and it will turn itself off during the duration of this pulse of time $T_1$, as shown in FIGURE 4. After the duration of this pulse $T_1$ the transistor 114 is turned off, and point 154 comes up to its positive value, since it is returned there by current flowing through resistor 106 from the plus power line.

The time interval $T_1$ is determined by the characteristics of transformer 130, and the time interval $T_2$ is determined by the RC network 94 and 96. The interval $T_2$ indicates the small time delay occurring before the motor power is turned on.

The above described cycle is repeated until the motor runs at substantially correct speed, as indicated by time $T_R$, at which time the duration of "on" and "off" pulses is substantially the same. In this mode of constant or rated (desired) speed operation, the motor will be turned on by an "on" pulse that has been stored in capacitor 86; and it will be turned off again before another pulse comes along to charge up capacitor 86. In that case, voltage is present at point 150 but not present at point 148, so that the motor stays off until the next pulse from the oscillator network appears at point 148. This condition of "in phase" relationship between the "on" and "off" pulses is shown at the right hand of FIGURE 4. As indicated above, the zero reset network H essentially comprises a feedback from the motor M, so that the dividers B are slaved to the motor frequency. In FIGURE 4, there is indicated the waveform at point 156 disclosing that a negative spike appears at each positive pulse from coil 120, so that only at constant or desired speed mode of operation are the output pulses of the oscillator network at point 152 in phase with the reset pulses at point 156. Thus, as long as the motor is running too fast or too slow, the resetting network H serves to control the output of the second And Gate E so that it is in phase with the pulses appearing at point 156, while being out of phase with the output of the oscillator network appearing at point 152.

Should the motor accelerate to a condition of overspeed, as indicated in FIGURE 5, then 125 represents the frequency of the motor. The voltage waveform at point 154 is such that power is substantially turned off to the motor and it receives this very small amount of power until such time as the motor slows down and again reaches the timing interval shown in the right hand of FIGURE 4. The resetting pulses appearing at point 156 cause the dividers to discharge as appears at points 144 and 146, thereby creating an "on" pulse at point 152, but the motor is not supplied with power since the time during which power is applied to the motor is determined by the time interval $T_1$ as discussed previously. This is the time determined by the pulse transformer 130, and is the time during which power is applied to the motor by bypassing the control rectifier 102 when transistor 114 is turned on. During this time power is applied to the motor, because the oscillator causes the voltage to appear at point 152, and this voltage is dissipated in the gate of control rectifier 102 during the time that it is bypassed so that this SCR 102 does not turn on. Thus at the end of time $T_1$ the two dividers are reset back to zero and power is off to the motor and continues to stay off as long as the motor continues to run fast. The control rectifier 102 will thus not turn on to apply power to the motor until the speed decreases. In order to more clearly understand the nature of the timing interval $T_2$, reference is made to FIGURE 6. 69 is the representation of a pulse out of the 3:1 divider and 71 is a representation of a pulse out of the 4:1 divider. 152 is the voltage at the output of And Gate D which starts as soon as both dividers are on, and ends as soon as one of them is turned off (i.e., 69). The pulse at point 148 in line 103 is the amplified output of the And Gate D. The length of the pulse at point 148 is determined by the circuit constants. The voltage at point 150 is the gate of the control rectifier 88, and the voltage in line 101 is that appearing at the gate of control rectifier 102. As soon as the voltage appears in line 101 at the gate of control rectifier 102, it will fire and the voltage at point 154 in line 9 will drop to zero; the instant that happens, a negative going spike appears at point 156.

From the above, it is seen that the system is self-regulating to the extent that the motor is caused to produce on off pulse for each pulse from AND gate D, thereby making the rate or speed synchronous with the crystal oscillator at the desired speed. Should voltage or load transients cause a tendency for overspeed, the "off" pulse will occur while power to the motor is already off from a previous "off" pulse; and since this second off pulse re-sets the divider network B to zero time through the action of zero set network H, the next signal from AND gate D cannot occur until twelve crystal oscillator cycles later. So long as the motor continues too fast, no "on" pulses can be transmitted through AND gate E to the power circuit F, and the motor will continue to coast without power, resulting in deceleration.

Summarizing the operation, it is seen that when the motor is below the desired speed, it receives power except during the time delay which is caused by capacitor 96 (which in one embodiment was only of the order of 0.2% of the total time); and when the motor speed is too fast, the motor receives power only during the interval determined by the duration of the "off" pulse produced by circuit G (which may be 3% of the total time). There is thus only one stable operating condition for the circuit of the invention, i.e., when the motor is running at the same speed as the crystal oscillator frequency with some phase difference between the two. This phase difference is self-regulating depending upon the power that the motor requires.

Figure 7:
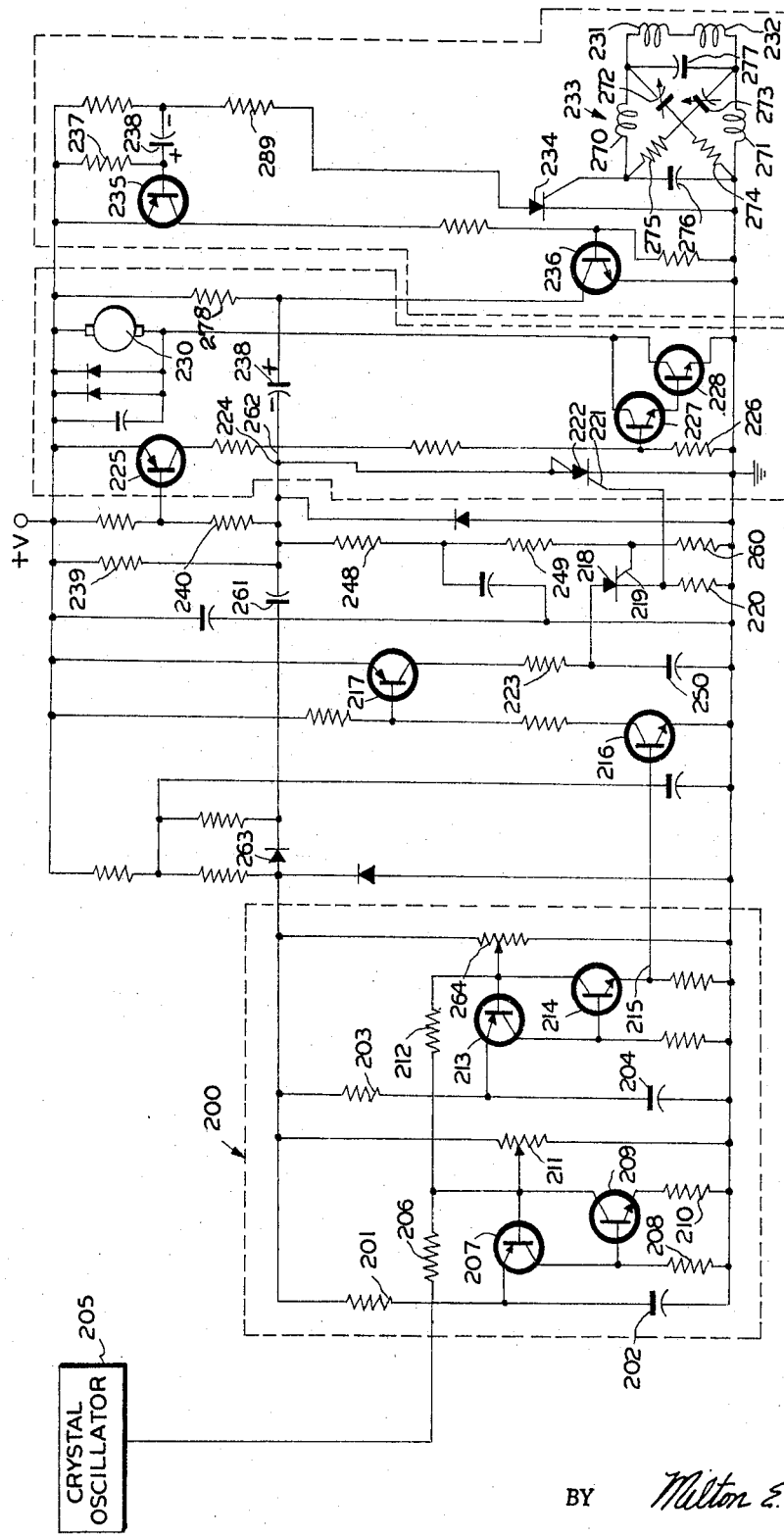
FIG. 7 is a schematic wiring diagram showing a second embodiment of the invention.

FIG. 7 illustrates an alternative embodiment of the invention using different circuitry for the frequency divider, the gate circuits, and the power applying circuits, all having certain advantages over the circuitry of FIG. 2.

In addition, FIG. 7 illustrates a novel form of stabilization control for incrementally varying the width of the power pulses applied to the motor in opposition to the tendency of the motor speed to "jitter." As will be seen, this "jitter" responds to changes in motor speed and tends to maintain the motor speed constant. Therefore it may be considered as an anticipatory control or an acceleration control.

Referring to FIG. 7 for a detailed understanding of the preferred circuits, the frequency divider circuit is shown within the dotted enclosure 200.

As shown, the frequency divider comprises a first resistance 201 and capacitor 202 connected in a timing circuit having a preset time constant, and a second resistance 203 and a capacitor 204 interconnected in a timing circuit having a much longer time constant than the first circuit. The incoming negative pulses from the crystal oscillator 205 are applied through resistor 206 to the base of a transistor 207 whose collector and emitter electrode are interconnected through a small resistor 208 to short-circuit the capacitor 202. The base electrode of transistor 207 is also positively biased by means of potentiometer 211 so that normally it is in a nonconducting condition. The time constant of resistance 201 and capacitor 202 is selected such that a sufficiently large positive charge is applied to the capacitor 202 within a time period of three pulses from the oscillator 205, whereby upon the third oscillator pulse being produced, the transistor 207 is rendered conductive to discharge the capacitor 202 therethrough. The conduction of transistor 207 directs a current through resistor 208 and in turn renders the transistor 209 conducting to pass current through a small resistor 210. The conduction of transistor 207 directs a current through resistor 208 and in turn renders the transistor 209 conducting to pass current through a small resistor 210. The conduction of transistor 209 effectively places its collector at ground potential and applies an amplified negative going pulse through resistor 212 to the base electrode of transistor 213 in the second frequency divider circuit. The second frequency divider including the timing resistor 203 and capacitor 204 is essentially identical to that of the first pulse frequency divider circuit excepting that the time constant of resistance 203 and capacitor 204 is much longer and requires twelve cycles of the oscillator 205. Consequently, after receiving four amplified negative going pulses from the first frequency divider circuit, the capacitor 204 is sufficiently charged to discharge through transistor 213 and this, in turn, renders transistor 214 conducting to produce an output positive going pulse over line 215. Thus the cascaded pulse frequency divider circuits produce one output pulse for each 12 pulses produced by the crystal oscillator 205.

GATE CIRCUITS AND POWER APPLYING CIRCUITS

The start pulses over line 215 from the frequency dividers are applied to switching transistor 216 to render this transistor conducting and produce a negative going pulse at the collector electrode thereof. This negative going pulse is applied to the base electrode of a phase inversion switching transistor 217 to render transistor 217 conducting and thereby produce a positive going pulse at its collector electrode which in turn is applied to the anode of a silicon controlled rectifier gate 218. In the event that the control electrode 219 of the silicon controlled rectifier 218 is sufficiently positive when the positive incoming pulse is applied to its anode, the rectifier 218 is rendered conducting and a positive pulse is produced across resistor 220 and is directed to the control electrode 221 of the silicon controlled rectifier 222, thereby to render this latter rectifier conducting. The first controlled rectifier 218 is automatically extinguished when the incoming start pulse operates to turn off the transistors 216 and 217 preventing further current flow to the anode of rectifier 218. On the other hand, the controlled rectifier 222 continues to conduct and lowers the potential at junction 224 to ground potential. Upon the potential at junction 224 being lowered to ground potential, a more negative potential is applied to the base electrode of phase inversion transistor 225 rendering this transistor conducting, and this, in turn, applies a positive pulse across resistor 226 to turn on the transistors 227 and 228. Transistor 228 is a high current flow transistor that is turned on and off by its pilot transistor 227, and when turned on it applies a power pulse through the motor 230. So long as the controlled rectifier 222 remains conducting, the phase inversion transistor 225, the pilot transistor 227, and the high current transistor 228 remain conducting to continue directing the current or power pulse through the motor 230.

In a similar manner as described above in the first embodiment, the motor 230 is provided with feedback pulse producing means generally indicated as coils 231 and 232 at the lower right hand portion of the drawing. Consequently as the rotor of the motor rotates, feedback pulses are produced by windings 231 and 232 for each revolution and are directed through a filter network, generally designated 233, to the circuitry for terminating the motor power pulse.

The circuitry for terminating the power pulses applied to the motor in response to the feedback pulses comprises a silicon controlled rectifier 234, a phase inversion transistor 235, and a switching transistor 236. The feedback pulse, after passing through the filter network 233, is applied to the control electrode of the rectifier 234 to render this rectifier conducting. As this rectifier conducts, current flows through the resistor 289, and through the conducting rectifier 234. This current flow charges the capacitor 238, and upon reaching a sufficiently positive potential, with the polarity shown, it automatically extinguishes the controlled rectifier 234 thereby resetting the controlled rectifier 234 for the next feedback pulse. However, upon rectifier 234 becoming initially conducting, a negative going impulse is applied to the phase inversion transistor 235, rendering this transistor conducting which in turn applies a positive pulse to transistor 236 to render transistor 236 conducting. As will be recalled, upon the starting pulse being applied from the frequency divider circuit, the controlled rectifier 222 is rendered conducting and continues to conduct, thereby to apply the power pulse to the motor through the high current transistor 228. However, as the rectifier 222 is conducting, the current flows through resistor 278 and capacitor 238 and through the control rectifier 222 thereby to progressively charge the capacitor 238 with a potential having the polarity indicated. When the capacitor 238 becomes fully charged this does not extinguish the controlled rectifier 222, since current can continue to flow through the controlled rectifier through the resistor 239 and the paralleled resistor 240. However, upon the transistor 236 being triggered into conduction in response to the feedback pulse being produced, the charged capacitor 238 is then applied across the anode-to-cathode of controlled rectifier 222 through the conducting transistor 236 thereby to extinguish the controlled rectifier 222. Upon the control rectifier 222 becoming extinguished, the transistor 225 is rendered nonconducting and this, in turn, turns off or extinguishes the pilot transistor 227 and the high current transistor or transistors 228 thereby to terminate the power pulse being applied to the motor.

Briefly recapitulating the above sequence of operations, upon receiving a start pulse from the pulse frequency divider circuitry 200, the silicon controlled rectifier 218 is rendered conducting and this in turn renders controlled rectifier 222 conducting. When rectifier 222 is conducting, the transistors 225, 227, and the power transistor 228 are turned on to apply a power pulse to the motor. The rectifier 218 is automatically extinguished upon termination of the start pulse when transistor 217 becomes nonconducting but the rectifier 222 and the transistors 225, 227, and power transistor 228 continue to conduct and apply the power pulse to the motor. During the conduction of rectifier 222, the capacitor 238 is charged with the polarity indicated. Upon receiving a feedback pulse from the motor, the controlled rectifier 234 is rendered conducting and this in turn turns on the transistors 235 and 236. The conduction of transistor 236 applies the negatively poled charge on capacitor 238 across the anode-to-cathode terminals of the controlled rectifier 222 thereby to extinguish this controlled rectifier and terminate the power pulse applied to the motor. The controlled rectifier 234 is essentially self extinguishing, since the current flow therethrough passes through a capacitor 238 which after a period of time becomes charged in such a direction as to prevent further conduction through its anode-cathode. Upon rectifier 234 turning off or becoming nonconducting, the transistors 235 and 236 are also turned off and the feedback circuit is reset.

UNDERSPEED CONTROL

In the above described sequence of operation, each of the incoming start pulses from the frequency divider 200 operates to apply a power pulse to the motor, and this power pulse is terminated by the next succeeding feedback pulse being produced from the motor feedback coils 231 and 232. However, in the event that the motor is running under its desired speed, a second start pulse may be produced over line 215 while a power pulse is still being applied to the motor. Should this occur, the potential at junction 224 is essentially at ground potential due to conduction of controlled rectifier 222, and consequently this ground potential is applied through resistors 248 and 249 to the control electrode of silicon controlled rectifier 218. The incoming start pulse received at the anode of rectifier 218 cannot then operate or turn on the controlled rectifier 218 due to the fact that its control grid is essentially at ground potential. Consequently, for underspeed operation, the incoming start pulse applied through the phase inversion transistor 217 not dissipated by conduction of rectifier 218 but is stored in a storage capacitor 250 to apply a positive potential at the anode of rectifier 218. As soon as that power pulse is terminated by the next succeeding fedback pulse, the rectifier 218 is almost immediately fired or turned on by this charged capacitor 250 to again apply a power pulse to the motor. This underspeed operation repeats itself until the motor accelerates to a synchronous speed determined by the frequency of the start pulses from the frequency divider.

OVERSPEED CONTROL

In the event that the motor is running at a greater speed than determined by the start pulses, a feedback pulse will be produced by the feedback coils 31 and 32 at a time when the motor is not receiving a power pulse. In this case, the controlled rectifier 222 will be in a non-conducting condition and the potential at junction 224 will be more positive. Upon this feedback pulse being produced and transmitted through the filter 233, the controlled rectifier 234 is rendered conducting and, in turn, turns on the transistors 235 and 236 as above described. Upon transistor 236 becoming conducting, the potential at junction 224 drops to ground and a negative going pulse is directed backwardly over line 262 and through capacitor 261 and reversely poled diode 263 to the potentiometers 264 and 211 in the pulse frequency divider circuit. This negative pulse applied to potentiometer 264 turns on the transistor 213 to discharge the timing capacitor 204; and that applied to potentiometer 211 similarly turns on the transistor 207 to discharge the timing capacitor 202. This feedback pulse therefore resets the pulse frequency divider circuit 200. So long as the feedback pulses are produced whenever a power pulse is not being applied to the motor, this signifies that the motor is running at a speed greater than that determined by the start pulses. Consequently for each such feedback pulse produced, the pulse frequency divider will be continually reset until such time as the motor slows down and regains synchronism with the start pulses. Due to the longer time constant of the capacitor 238 and resistor 239, the feedback pulses being generated have a longer time duration than the start pulses, whereby the feedback pulses dominate or overcome the effect of any start pulses being produced over the pulse divider output line 215 during their time of occurrence.

ADDITIONAL STABILIZATION

The additional stabilization control of the present invention provides a means for incrementally varying the phase or time of occurrence of the feedback pulses in such manner as to shorten the power pulse applied to the motor if the motor is tending to accelerate over a preset speed or to lengthen the power pulse applied to the motor if the motor is tending to decelerate below its preset speed. In this manner, if the motor tends to decelerate below a preset speed, the power pulse applied to the motor is incrementally increased and if the motor tends to accelerate above a preset speed, the power pulse is incrementally lessened to reduce the energization of the motor. Since this additional control responds to changes in speed, it is in the nature of an acceleration stabilization. Stated in another manner, this anticipatory stabilization tends to maintain the motor running smoothly and eliminates the so-called "jitter" of the motor.

This function is performed by the filter 233, coupled to the motor feedback control windings 231 and 232, which filter serves to vary the phase of the feedback pulses being applied to the controlled rectifier 234. Referring to the drawing, the filter 233 is essentially a frequency band-pass filter in the form of a lattice network having series inductances 270 and 271 in opposite arms of the lattice, capacitors 276 and 277 in the parallel arms of the lattice, and R-C circuits including a variable capacitor 272 and resistor 274 in one diagonal of the lattice, and a variable capacitor 273 and resistor 275 in the other diagonal arm of the lattice.

In band-pass filters of this type, signals introduced at the input of the filter that are within the band-pass frequency are transmitted through the filter with substantially no change in phase. However signals applied to the input having a frequency lower than the band-pass range are delayed in phase at the output, and signals applied to the input having a frequency greater than the band-pass of the filter are advanced in phase at the output. Thus, when the motor tends to run at a speed under that preset by the filter, or in other words under that within the band-pass of the filter, the feedback pulses are retarded in phase before reaching the controlled rectifier 234 and consequently terminate the power pulses applied to the motor at a later time, thereby incrementally increasing the power to the motor to again reach synchronism. On the other hand, advancing the phase of the feedback pulses operates in a direction to terminate the power pulses before their normal termination and effectively decreases the power applied to the motor so that it tends to slow down and regain synchronism. In this manner, the filter 233 responds to the frequency of the feedback pulses to incrementally apply more power to the motor if it decelerates, or less power to the motor if it accelerates and thereby maintains the motor in synchronism with the preset speed. For changing the frequency of the filter, the capacitors 272 and 273 are made adjustable so as to enable the motor to be synchronized at different speeds as desired. Similarly, the crystal oscillator 205 or the frequency dividers 200 are made adjustable, as desired, for the same purpose.

It will be evident to those skilled in the art that many changes may be made in the preferred systems described without departing from the spirit and scope of this invention. Accordingly, this invention is to be considered as being limited only by the following claims appended hereto.

What is claimed is:

1. A speed control system for applying variable duration power pulses to a motor comprising:
   a constant frequency oscillator,
   a frequency divider circuit energized by said oscillator to produce start pulses at a lower frequency,
   a feedback pulse producer generating pulses at a rate corresponding to motor speed,
   means for energizing said motor with power pulses having a time duration proportional to the phase difference between said start pulses and feedback pulses and for discontinuing the power to the motor for the remaining time duration,
   a memory circuit responsive to the duration of the power pulses exceeding the preset period of said frequency divider circuit for delaying the following start pulse produced by said frequency divider circuit until just after the next succeeding feedback pulse is produced,
   and an overspeed control feedback circuit for resetting said frequency divider to disable a succeeding start pulse in the event that a feedback pulse is produced at a time when no power pulse is being applied to said motor.

2. A speed control system for applying variable duration pulses to a motor comprising:
   a constant frequency oscillator,
   a frequency divider circuit energized by said oscillator to produce start pulses at a lower frequency,
   a feedback pulse producer generating pulses at a rate corresponding to motor speed,
   means for energizing said motor with power pulses having a time duration proportional to the phase difference between said start pulses and feedback pulses,
   an underspeed control circuit responsive to the production of a start pulse in overlapping time relationship with a power pulse for delaying the start pulse until the power pulse is terminated,
   and an overspeed control circuit responsive to the production of a feedback pulse not in overlapping time relationship with a power pulse to disable said frequency divider circuit from producing the next succeeding start pulse.

3. A speed control system for applying variable duration power pulses to a motor comprising:
   a constant frequency oscillator,
   a frequency divider circuit energized by said oscillator to produce start pulses at a lower frequency,
   a feedback pulse producer generating pulses at a rate corresponding to the motor speed,
   means for energizing said motor with power pulses having a time duration proportional to the phase difference between said start pulses and feedback pulses,
   said energizing means including a gate circuit energized by said start pulses and said power pulses,
   said gate circuit delaying the operation of said energizing means in the event that a start pulse is produced in overlapping time relationship with a power pulse,
   and an overspeed control circuit responsive to a feedback pulse being produced when the motor is deenergized to reset said frequency divider circuit and prevent the application of the normally succeeding start pulse.

4. A motor speed control comprising:
   a constant frequency oscillator,
   a frequency divider energized by said oscillator to produce start pulses at a lower frequency,
   a feedback pulse producer generating pulses at a rate corresponding to motor speed,
   a switching means selectively energized by said frequency divider and deenergized by said feedback pulse producer to apply discontinous power pulses to said motor according to the phase difference therebetween,
   and a memory circuit for storing pulses from the frequency divider whenever said motor is receiving power when a start pulse is produced and releasing said stored pulse when power is subsequently disconnected from the motor,
   whereby in the event that the motor receives power for a period longer than the period of said frequency divider, said frequency divider operates said switching means substantially immediately after power is disconnected from the motor thereby to accelerate the motor,
   and an overspeed control circuit for resetting said frequency divider circuit and preventing the next succeeding pulse therefrom in the event that a feedback pulse is produced at a time when power is disconnected from the motor.

5. A motor speed control comprising:
   an oscillator means producing start pulses,
   a feedback pulse producer generating pulses at a rate corresponding to motor speed,
   a switching means for applying discontinuous power pulses to the motor having a duration proportional to the phase difference between successive pulses from the oscillator means and the feedback pulse producer,
   an underspeed control circuit for time delaying the start pulses from the oscillator means until immediately after each pulse from the feedback pulse producer to maximize the duration of the power pulses applied to the motor until the motor accelerates to a desired speed,
   an overspeed feedback control circuit for disabling the oscillator means from producing start pulses until the motor decelerates to the desired speed.

6. A motor speed control comprising:
an oscillator means producing start pulses,
a feedback pulse producer generating pulses at a rate corresponding to motor speed,
a switching means for applying discontinuous power pulses to the motor having a duration proportional to the phase difference between successive pulses from the oscillator means and the feedback pulse producer,
an underspeed control circuit for time delaying the start pulses from the oscillator means until immediately after each pulse from the feedback pulse producer to maximize the duration of the power pulses applied to the motor until the motor accelerates to a desired speed,
an overspeed feedback control circuit for disabling the oscillator means from producing start pulses until the motor decelerates to the desired speed,
and means responsive to the frequency of the pulses produced by the feedback pulse producer for time delaying said feedback pulses when the motor is underspeed and for time advancing said feedback pulses when said motor is overspeed.

7. A speed control system for applying variable power pulses to a motor comprising:
an oscillator means for producing start pulses,
a feedback pulse producer generating pulses at a rate corresponding to the motor speed,
and means for energizing said motor with discontinuous power pulses having a time duration proportional to the phase difference between successive start pulses from the oscillator means and the feedback pulse producer,
and a stabilizing means for incrementally varying the duration of the power pulses to prevent motor jitter,
said stabilizing means including a frequency responsive circuit responsive to the frequency of the pulses produced by the feedback producer for advancing the phase of said feedback pulses when the frequency tends to exceed a preset frequency and for delaying the phase of said feedback pulses when the frequency tends to lag said preset frequency.

8. A speed control system for applying discontinuous variable duration power pulses to a motor comprising:
an oscillator producing start pulses,
a feedback pulse producer generating feedback pulses at a rate corresponding to the motor speed,
said feedback pulse producer including a stabilizing circuit responsive to the frequency of said feedback pulses tending to lag behind a preset frequency for delaying the phase of the feedback pulses and responsive to the frequency of the feedback pulses tending to increase beyond said preset frequency to advance the phase of said feedback pulses,
means for energizing said motor with discontinuous power pulses having a time duration proportional to the phase difference between said start pulses produced by said oscillator means and the pulses from said stabilizing means,
an underspeed control circuit for time delaying the start pulses to occur shortly after each feedback pulse until the motor accelerates to a desired speed,
and an overspeed control circuit for disabling the production of start pulses until the motor decelerates to said desired speed.

9. A speed control system for a motor comprising:
switching means for applying variable duty cycle power pulses to said motor,
said switching means including means responsive to the motor speed for increasing and decreasing the duty cycle of said power pulses in response to the motor speed falling below or above a preset speed,
and means responsive to acceleration and deceleration of said motor from said preset speed for incrementally changing the duty cycle of said power pulses to stabilize the motor at said preset speed.

10. A speed control system for a motor comprising:
a frequency reference source of pulses,
a feedback source of pulses actuated by said motor at a frequency corresponding to the motor speed,
switching means responsive to said reference source and said feedback source for applying variable duty cycle power pulses to said motor to regulate its speed,
and a stabilizing circuit included in said switching means for incrementally adjusting the duty cycle of said power pulses in opposition to the tendency of the motor to accelerate above and below a preset speed.

11. A motor speed control system comprising:
an oscillator producing pulses,
a feedback pulse producer actuated by said motor to produce pulses at a frequency determined by the speed of the motor,
a switching means for applying discontinuous variable duty cycle power pulses to said motor to synchronize said feedback pulses with the oscillator pulses,
and a stabilizing circuit for incrementally adjusting the duty cycle of said power pulses in opposition to the motor acceleration above and below a preset speed,
said stabilizing circuit comprising means responsive to the frequency of the feedback pulses to advance the phase of the feedback pulses when the motor accelerates above said preset speed and to retard the phase of the feedback pulses when the motor decelerates below said preset speed.

12. A speed control system for applying variable discontinuous power pulses to a motor comprising:
a reference pulse producer means for initiating each power pulse,
a feedback pulse producer actuated by the motor to produce feedback pulses to terminate each power pulse,
and a stabilizing means reversibly responsive to the difference in motor speed over a preset reference speed to incrementally change the phase of the feedback pulses.

References Cited by the Examiner

UNITED STATES PATENTS

| | | | |
|---|---|---|---|
| 2,932,778 | 4/1960 | Curtis | 318—318 X |
| 3,176,208 | 3/1965 | Gifft | 318—318 X |
| 3,192,461 | 6/1965 | Hohne | 318—318 |

ORIS L. RADER, *Primary Examiner.*

J. C. BERENZWEIG, *Assistant Examiner.*